US012734553B2

(12) United States Patent
Mach et al.

(10) Patent No.: US 12,734,553 B2

(45) Date of Patent: Sep. 15, 2026

(54) SORTING APPARATUS, SEPARATING SYSTEM AND ASSOCIATED METHODS

(71) Applicant: TRUMPF Werkzeugmaschinen SE + Co. KG, Ditzingen (DE)

(72) Inventors: Patrick Mach, Korb (DE); Magnus Deiss, Stuttgart (DE); Pascal Kull, Karlsruhe (DE); Volker Rominger, Steinheim (DE)

(73) Assignee: TRUMPF WERKZEUGMASCHINEN SE + CO. KG, Ditzingen (DE)

(*) Notice: Subject to any disclaimer, the term of this patent is extended or adjusted under 35 U.S.C. 154(b) by 0 days.

(21) Appl. No.: 18/944,105

(22) Filed: Nov. 12, 2024

(65) Prior Publication Data

US 2025/0065376 A1 Feb. 27, 2025

Related U.S. Application Data

(63) Continuation of application No. PCT/EP2023/061713, filed on May 3, 2023.

(30) Foreign Application Priority Data

May 13, 2022 (DE) ..................... 10 2022 112 048.1

(51) Int. Cl.
*B07C 5/36* (2006.01)
*B07C 5/06* (2006.01)

(52) U.S. Cl.
CPC . *B07C 5/36* (2013.01); *B07C 5/06* (2013.01)

(58) Field of Classification Search
CPC ................................ B07C 5/36; B65G 11/123
(Continued)

(56) References Cited

U.S. PATENT DOCUMENTS 5,259,107 A 11/1993 Tanabe et al.
2009/0090595 A1 4/2009 Cumbria et al.
(Continued)

FOREIGN PATENT DOCUMENTS

CN 208165034 U 11/2018
CN 208629393 U 3/2019
(Continued)

OTHER PUBLICATIONS

Yamamoto; Michiya, "Micro Joint Separation Device" (English Translation), Oct. 13, 2005, worldwide.espacenet.com (Year: 2005).*
(Continued)

*Primary Examiner* — Molly K Devine
(74) *Attorney, Agent, or Firm* — LEYDIG, VOIT & MAYER, LTD.

(57) ABSTRACT

A sorting apparatus for sorting workpieces of a workpiece sheet includes a support region with support elements for placing the workpiece sheet thereon. At least one sorting opening for the workpieces to fall through is formed between adjacent support elements. The sorting apparatus further includes a collection region arranged below the support region and having at least two collection compartments for collecting the workpieces, a guide region arranged between the support region and the collection region and having at least one guide element for guiding the workpieces falling through the at least one sorting opening to the collection compartments, and an adjustment device for adjusting the collection compartments relative to the at least one guide element and/or for adjusting the at least one guide element relative to the collection compartments such that, via the at least one guide element, workpieces are selectively fed to a respective collection compartment.

20 Claims, 8 Drawing Sheets

(58) Field of Classification Search
USPC .......................................................... 209/702
See application file for complete search history.

(56) References Cited

U.S. PATENT DOCUMENTS

| | | | | |
|---|---|---|---|---|
| 2010/0122970 | A1* | 5/2010 | Caristan | B23K 37/0408 219/121.72 |
| 2019/0091754 | A1 | 3/2019 | Deiss et al. | |
| 2019/0091817 | A1 | 3/2019 | Epperlein et al. | |
| 2019/0243343 | A1 | 8/2019 | Kiefer | |
| 2021/0178540 | A1 | 6/2021 | Wolf et al. | |

FOREIGN PATENT DOCUMENTS

| | | | | |
|---|---|---|---|---|
| CN | 210284290 | U | 4/2020 | |
| CN | 210391266 | U | 4/2020 | |
| CN | 214874892 | U | 11/2021 | |
| CN | 215154805 | U | 12/2021 | |
| CN | 216102223 | U | 3/2022 | |
| DE | 102016110542 | A1 | 12/2017 | |
| DE | 202018001674 | U1 | 5/2018 | |
| DE | 102016120131 | B4 | 8/2020 | |
| EP | 482702 | A * | 4/1992 | B62D 7/20 |
| EP | 2314393 | A1 | 4/2011 | |
| EP | 2436474 | A1 | 4/2012 | |
| JP | S63260692 | A | 10/1988 | |
| JP | H04371328 | A | 12/1992 | |
| JP | H05228544 | A | 9/1993 | |
| JP | H07256371 | A | 10/1995 | |
| JP | H09225900 | A | 9/1997 | |
| JP | 2000061565 | A | 2/2000 | |
| JP | 2000094057 | A | 4/2000 | |
| JP | 2001205363 | A | 7/2001 | |
| JP | 2002059222 | A | 2/2002 | |
| JP | 2003260694 | A | 9/2003 | |
| JP | 2005088059 | A | 4/2005 | |
| JP | 2005246582 | A | 9/2005 | |
| JP | 2005279753 | A | 10/2005 | |
| JP | 2009039747 | A | 2/2009 | |
| JP | 2014214009 | A | 11/2014 | |
| KR | 101064271 | B1 | 9/2011 | |
| WO | WO 2022210098 | A1 | 10/2022 | |

OTHER PUBLICATIONS

Danninger; Egon, "Press with Tool Changing Device" (English Translation), Apr. 27, 2011, worldwide.espacenet.com (Year: 2011).*
Zhang; Xiang, "Auxiliary Device for Finished Product Transfer" (English Translation), Dec. 14, 2021, worldwide.espacenet.com (Year: 2021).*
Yukio; Nitta, "Micro Joint Separation Recovery Device" (English Translation), Sep. 2, 1997, worldwide.espacenet.com (Year: 1997).*

* cited by examiner

SORTING APPARATUS, SEPARATING SYSTEM AND ASSOCIATED METHODS

CROSS REFERENCE TO RELATED APPLICATIONS

This application is a continuation of International Application No. PCT/EP2023/061713 (WO 2023/217612 A1), filed on May 3, 2023, and claims benefit to German Patent Application No. DE 10 2022 112 048.1, filed on May 13, 2022. The aforementioned applications are hereby incorporated by reference herein.

FIELD

Embodiments of the present invention relate to a sorting apparatus for assisting a sorting operation of workpieces of a workpiece sheet, a separating system for separating workpieces of a workpiece sheet, a method for sorting workpieces of a workpiece sheet, and a method for separating workpieces of a workpiece sheet.

BACKGROUND

When sorting workpieces on machine tools, in particular laser-cut or punched workpieces, in particular sheet metal parts, sorting apparatuses are typically used by means of which different workpieces are sorted into different workpiece collection units provided for this purpose on a sorting apparatus. Such a sorting apparatus is disclosed, for example, in DE102016120131B4.

However, the manual sorting of the workpieces cut or punched from the workpiece sheet, especially small parts in mini nests, carried out according to the current prior art, is not ergonomic because, for example, the sorting is carried out from a sorting table on the flatbed machine tool. Workpieces can also fall to the floor and become damaged. In addition, the workpieces can scratch the support bars of the machine pallet. The known type of sorting is therefore very time-consuming and labor-intensive.

SUMMARY

Embodiments of the present invention provide a sorting apparatus for assisting a sorting operation of workpieces of a workpiece sheet. The workpieces are connected to the workpiece sheet by predetermined breaking points. The sorting apparatus includes a support region with support elements for placing the workpiece sheet thereon. At least one sorting opening for the workpieces to fall through is formed between adjacent support elements. The sorting apparatus further includes a collection region arranged below the support region and having at least two collection compartments for collecting the workpieces falling through the at least one sorting opening, a guide region arranged between the support region and the collection region and having at least one guide element for guiding the workpieces falling through the at least one sorting opening to the collection compartments, and an adjustment device for adjusting the collection compartments relative to the at least one guide element and/or for adjusting the at least one guide element relative to the collection compartments such that, via the at least one guide element, workpieces are selectively fed to a respective collection compartment selected from the at least two collection compartments by the adjusting.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
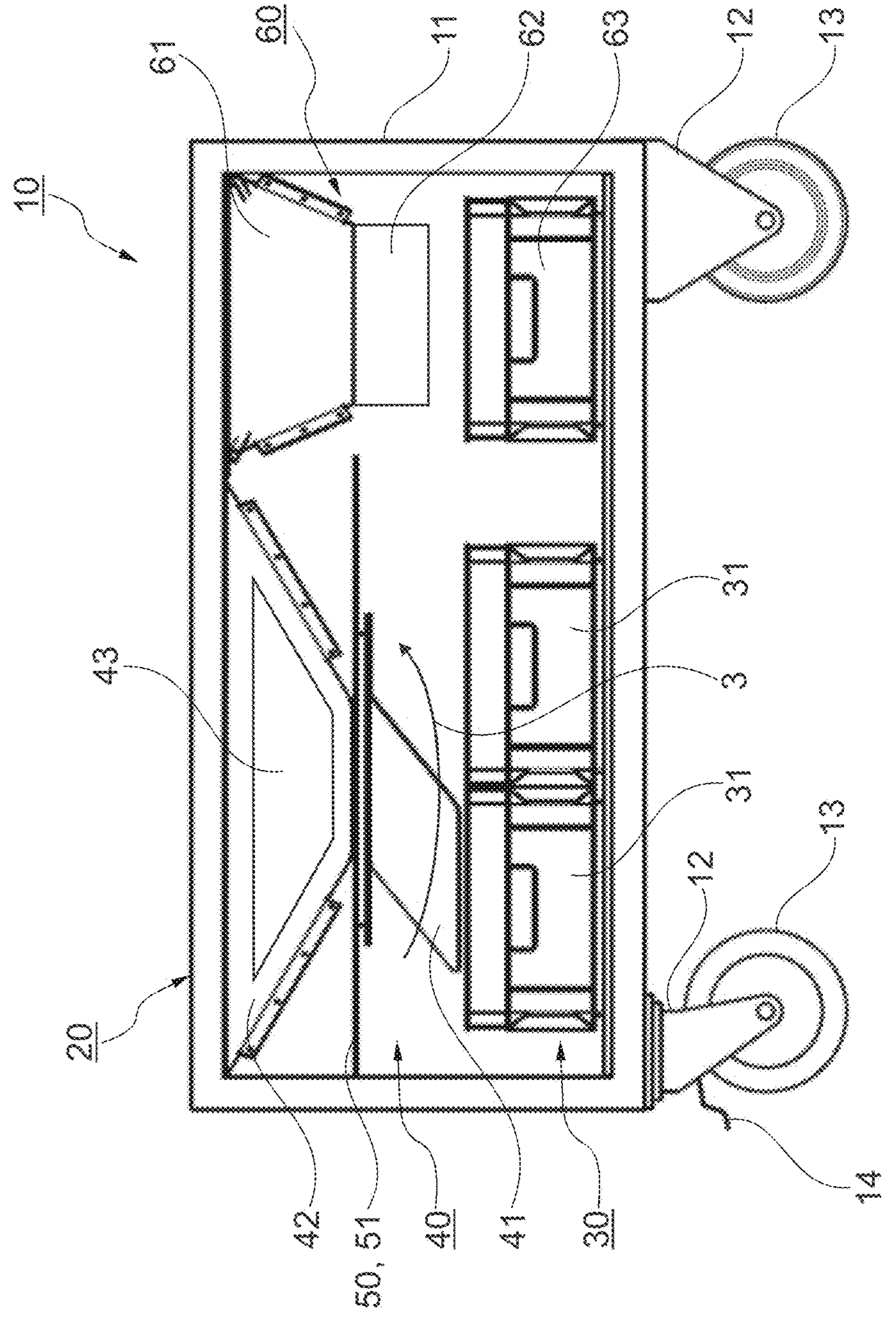
FIG. 1 is a side view of a sorting apparatus according to an exemplary embodiment of the invention.

Embodiments of the invention can enable improved, in particular ergonomic, simple, and rapid sorting of workpieces of a workpiece sheet compared to the prior art.

Accordingly, a sorting apparatus is provided for assisting a sorting operation of workpieces of a workpiece sheet in which the workpieces are connected to the workpiece sheet by a predetermined breaking point. The sorting apparatus has a support region with support elements for placing the workpiece sheet thereon, wherein at least one sorting opening for the workpieces to fall through is formed between the support elements. Furthermore, the sorting apparatus has a collection region which is arranged below the support region, in particular in the falling direction of the workpieces, and has at least two collection compartments for collecting the workpieces falling through the at least one sorting opening. In addition, the sorting apparatus has a guide region which is arranged between the support region and the collection region and has at least one guide element for guiding the workpieces falling through the at least one sorting opening to the collection compartments. Finally, the sorting apparatus has an adjustment device for adjusting the collection compartments relative to the at least one guide element and/or for adjusting the at least one guide element relative to the collection compartments such that, by means of the at least one guide element, workpieces can be selectively guided to a collection compartment selected from the at least two collection compartments by the adjustment.

Hence, according to embodiments of the invention, a sorting apparatus is provided which assists the sorting operation of workpieces from the workpiece sheet. On the one hand, this support consists in the fact that the processed workpiece sheets can be placed on the support elements. On the other hand and above all, the support consists of guiding different workpieces into a selected collection compartment of the collection compartments, wherein the respective collection compartment can be selected according to the geometry, in particular two-dimensional shape and/or size, of the workpieces which are to be sorted. After the selection of the collection compartment, the adjustment device is used to adjust the collection compartments and/or the at least one guide element relative to the other of these components so that the selected collection compartment is brought into connection with the at least one guide element for guiding the workpieces, by means of which workpieces can be guided via the at least one guide element into the respectively selected collection compartment of the plurality of collection compartments.

Consequently, ergonomic working is made possible for a worker on the one hand by providing a sorting apparatus for sorting, which can be worked on in or on a support region. This support region is preferably located at an ergonomic working height in the range of 0.6 m to 1.30 m, or 0.7 m to 1.20 m, or 0.8 m to 1.10 m. The support region can be at least partially height-adjustable. The height adjustability can be provided, for example, by a mechanical and/or electrical drive.

On the other hand, ergonomic working is made possible for a worker because the collection compartments do not have to be exchanged or moved back and forth for workpieces of different geometries. Instead, the collection compartments arranged in the collection region can remain in their position relative to each other until they are full and can be emptied. Since the collection compartments become heavier while being filled with workpieces, and lifting them would mean a great deal of physical exertion, this can reduce physically demanding work for workers. The workpieces also do not have to be laboriously sorted by hand into one of a plurality of collection compartments. This also reduces the risk of workpieces accidentally landing in the wrong collection compartments. Instead, simply by adjusting by means of the adjustment device, a respective collection compartment can be selected for some or all of the workpieces of a processed workpiece sheet so that each workpiece falling through the at least one sorting opening is always guided to this collection compartment by means of the at least one guide element. Between the sorting of different workpiece sheets or during the sorting of one workpiece sheet, the adjustment device can be easily operated to select a different collection compartment or to change the collection compartment into which the workpieces are to be sorted, guided by the at least one guide element.

In the present case, a workpiece sheet is understood to mean in particular a workpiece panel which has its greatest extent in a horizontal plane and is configured with a thickness in the vertical plane orthogonal thereto. A workpiece sheet can in particular be a metal workpiece sheet. Such a workpiece sheet is also referred to herein as a processed workpiece sheet if workpieces are incorporated therein which are connected to the workpiece sheet by a predetermined breaking point. Such a predetermined breaking point can be designed in particular in the form of a web or a plurality of webs between the workpiece and the workpiece sheet or a remaining grid of the workpiece sheet, or between two adjacent workpieces. In particular, the web can be designed as a microjoint, nanojoint, and/or microweld. Microjoints extend over the entire workpiece thickness, while nanojoints extend over only a portion of the workpiece thickness. Microwelds are small welding points that are specifically formed in a cutting gap between the workpiece and the workpiece sheet or between two adjacent workpieces. The predetermined breaking point, in particular the web, ensures on the one hand that the workpiece sheet with all workpieces can be safely removed from the flatbed machine tool, and on the other that it is possible to easily remove the workpieces from the workpiece sheet.

Such workpieces can be processed in particular by means of a flatbed machine tool which can, for example, be a laser cutting or punching flatbed machine tool, in particular a 2-D laser flatbed machine. The flatbed machine tool can also be a combination machine that implements both separation methods. Other processing steps such as deburring, bending, folding, welding, drilling, thread cutting, etc., can also be carried out on the flatbed machine tool. The flatbed machine tool separates the workpieces, the shape of which is specified for the flatbed machine tool, from the rest of the workpiece sheet by means of laser cutting or punching. The workpieces are therefore in particular cut or punched out of the workpiece sheet by means of a laser. However, the predetermined breaking point remains which connects each workpiece to the rest of the workpiece sheet which can be present as a residual grid or a group of parts without a residual grid, and may represent recyclable scrap. There can also be a plurality of predetermined breaking points between each workpiece and the workpiece sheet. The workpiece sheet processed in this way can then be fed to the sorting operation, since the workpieces are still attached to the residual grid by means of the predetermined breaking point. An appropriate tool, such as a so-called vibrating hammer or a drill, can be used to break open the predetermined breaking point or detach the workpieces from the workpiece sheet or the residual grid. The vibrating hammer uses vibration to deliver periodically repeated blows to the workpiece sheet so that the workpieces are detached from the workpiece sheet. The predetermined breaking point can be broken open using a drilling machine by drilling at the predetermined breaking point or at a drilling point provided next to the workpiece, in particular a so-called microjoint.

In general, the workpiece sheets, and accordingly the workpieces, can consist of, for example, sheet metal, glass, semiconductor substrate structures, circuit board structures, and/or plastic parts. The mentioned laser cutting or punching flatbed machine tools can be used in particular to produce workpieces from a solid material that has a bending strength which does not lead to any significant deformation during sorting.

When the workpieces are detached from the workpiece sheet resting in or on the support region, the workpieces fall through at least one sorting opening, in particular due to gravity. For this purpose, the at least one sorting opening or the sorting openings are correspondingly dimensioned to be larger than the average, most of, or the largest workpiece geometries, in particular along the horizontal or planar extension of the workpieces. After falling through, sorting is performed in the sorting apparatus. Sorting means that the workpieces are correspondingly put together for further processing or delivery. The assembly can be done, for example, by collecting workpieces of the same or similar geometry in the respective collection compartments. However, it can also be provided that the same geometries be collected in different collection compartments. The advantage of this is that the collection compartments can be smaller and are therefore easier to handle. The workpieces assembled in this way can, for example, be sent for further processing or delivery.

The guiding region with its at least one guiding element is designed in particular for passive guiding, due to the gravity acting upon the workpieces. In other words, the guide region and the at least one guide element are preferably not active elements such as conveyor belts or the like; instead, the guide region advantageously specifies only the spatial direction and accordingly the location for the workpiece. The workpieces can advantageously slide or glide on the at least one guide element. The at least one guide element can have a non-slip and/or sliding surface for guiding the workpieces. Advantageously, the surface of the at least one guide element is metallic, but may alternatively consist of another material.

The sorting apparatus can be configured to be operated fully manually, partially automated, and/or fully automated. Different operating steps by a worker on the sorting apparatus as well as different degrees of automation are explained in more detail below, as are other advantageous features.

Preferably, the sorting apparatus is designed with rollers for moving the sorting apparatus. The sorting apparatus can in particular have at least three rollers, preferably four rollers. This means that the sorting apparatus can be moved flexibly within the production hall. By means of the rollers, the sorting apparatus can, for example, be easily moved in front of the flatbed machine tool to enable the workpiece sheets to be picked up there for subsequent sorting. At the same time, the sorting apparatus with the workpieces sorted into the collection compartments can easily be moved to the further processing or delivery point of the workpieces in order to be supplied there to further processing or delivery. This eliminates the otherwise time-consuming and cumbersome reloading of the collection compartments onto a means of transport to bring the workpieces to the next processing or delivery point.

It is preferred for a brake, in particular a parking brake, to be arranged on at least one of the rollers. Preferably, on at least two rollers, a brake can be arranged, in particular located on the same side of the sorting apparatus. This allows the sorting apparatus to be secured in its position for safe working.

It is further preferred that the at least one guide element be designed as a funnel, a tube, a chute, and/or a flap. Accordingly, the at least one guide element can be designed as a funnel, a tube, a chute, a flap, or any combination of the above. This enables geometrically favorable guidance of the workpieces to the selected collection compartment. The funnel can, for example, have a multi-sided, in particular four-sided, or a round cross-section. The funnel, the tube, or the chute has a corresponding opening or an end from which the workpieces exit the funnel, the tube, the flap, or the chute. This opening or this end is preferably aligned with one of the collection compartments when adjusted by the adjustment device.

It can also be advantageous if at least one guide element is designed to be flexible. The flexibility facilitates the adjustability of at least one guide element so that this can be done easily. By means of the adjustment device or another device, preferably the position once set by flexible adjustment of the guide element can be secured. The at least one flexible guide element can, for example, be a tube, a net, and/or a guide element, flexibly constructed with segments, by means of which the flexibility of the at least one guide element is provided. The hose can be a rubber hose, for example, the net can be a metal net, and the segments can consist of plastic or metal, for example.

It can also be advantageous if the guide region has a funnel element which is arranged above the at least one guide element, in particular in the falling direction of the workpieces. By means of this funnel element, the entirety of the workpieces that fall through the at least one sorting opening can advantageously be bundled before they are subsequently guided by the at least one guide element into the collection compartment that is correct or selected by adjustment. The funnel element can, for example, have a multi-sided, in particular four-sided, or a round cross-section. Preferably, the funnel element is arranged to be stationary relative to the support region.

A simple variant of the sorting apparatus is when the adjustment device is a manually operable adjustment device. For this purpose, the adjustment device can have one or more handles. The handle or the handles allow easy manual operation by the worker.

However, it is additionally or alternatively possible for the adjustment device to be an automatically operable adjustment device. This means that the adjustment is carried out automatically by the adjustment device, e.g., by means of a corresponding drive—for example, an electric drive. For the automatic operation of the adjustment device, a corresponding actuating unit can be provided—for example, in a simple embodiment, one or more actuating buttons, a foot switch, a remote control, a control panel, or the like. This facilitates the adjustment by the workers who have to make it and further improves ergonomics.

It is also advantageous if the adjustment device has a rotary mechanism and/or linear mechanism for rotating and/or linearly displacing the at least one guide element or the collection compartments relative to one another. This means that either the at least one guide element is rotated and/or linearly displaced relative to the collection compartments, or the collection compartments are rotated and/or linearly displaced relative to the at least one guide element. A rotary mechanism and/or linear mechanism provides a geometrically simple adjustability of at least one guide element, which can be easily manufactured.

It is preferred if the rotating mechanism has a rotating wheel, connected to the at least one guide element, with at least one handle for rotating the at least one guide element relative to the collection compartments. This means that the advantageous rotating mechanism is coupled in a simple manner by means of an easily actuatable manual actuating unit. The handle can run completely or partially along the entire rotary wheel. For example, the rotary wheel can have a metallic and round base body on which the handle(s) consist of another material with increased grip, such as a plastic.

It is also advantageous if the adjustment device has locking positions into which the adjustment device locks during adjustment when the at least one guide element is in a predefined relative position with respect to at least one of the collection compartments. On the one hand, a safety mechanism can ensure a position that has been set by adjustment so that the position is not lost during sorting, which could lead to the workpieces being sorted incorrectly. In addition, this can provide haptic and/or acoustic feedback during adjustment that one of several, in particular pre-defined, positions has been reached.

Advantageously, the guide region also comprises at least one sound absorption element. A plurality of sound absorption elements can also be provided. This sound absorption element or these sound absorption elements can be located, for example, on the at least one guide element and/or on the previously mentioned funnel element. In particular, they can be located on the rear sides of the at least one guide element and/or the funnel element so that the guidance of the workpieces is not impaired by the sound absorption element(s). For example, the at least one sound absorption element can be a sound absorption or soundproofing mat—for example, made of bitumen. This can, for example, be easily glued to the rear side of the at least one guide element and/or the funnel element.

Preferably, the collection region has at least four collection compartments. This allows workpieces to be divided into four different categories based upon their geometry and sorted into the respective collection compartments. The adjustment device can have four positions in which the at least one guide element leading to one of the four collection compartments is arranged, in order to be able to supply each of the four collection compartments with workpieces.

It is also preferred if the collection compartments are designed as collection boxes. Collection boxes are boxes that are designed separately from each other and from the sorting apparatus, such as a frame or housing of the sorting apparatus. They can therefore be removed from the sorting apparatus easily when they are full of workpieces. In addition, they can be easily replaced. Preferably, the collection boxes have at least two handles to make them easy to transport, in particular to lift them out of the collection region.

The support elements can preferably be designed as support bars that are spaced apart from one another and arranged parallel to one another. They can run or be arranged between two sides, in particular long and/or parallel sides, of the sorting apparatus. The sorting apparatus can have a plurality of sorting openings which are formed between two support elements or support bars. This advantageous design of the support region as a support grid allows a stable support for the workpiece panel thanks to the plurality of support bars and an easy sorting of the workpieces from the workpiece panel by means of the plurality of sorting openings.

Preferably, the support elements have brushes on a support side for placing the workpiece sheet, and/or are designed to be elastic. The elastic design of the support elements on the support side can be achieved, for example, by an elastic element, in particular a coating or nubs, on the support elements. These can consist, for example, of rubber. However, it is also possible to manufacture the support elements themselves from an elastic material—for example, from a plastic. Alternatively, the support elements can consist of a metal. A particular advantage is provided by the design with the brushes, because the workpiece sheet can slide well on them, and this facilitates handling the workpiece sheet. The brushes also significantly reduce the noise level when sorting with the vibrating hammer. Such brushes and/or the elastic design of the support side of the support elements prevent the workpieces from being scratched in the support region. Consequently, a high production quality can also be ensured during sorting.

It is also preferred if support elements are heat-resistant up to at least 80° C. This also applies to any brushes and/or elastic embodiments of the support elements that may be provided. For example, the brushes can be made of polyamide (which is heat-resistant up to approx. 100° C.) or aramide (which is heat-resistant up to at least 370° C.). Accordingly, the still hot workpiece sheet can be brought from the flatbed machine tool to the support region without prior cooling or with only a very short cooling time. This enables rapid sorting after processing in the flatbed machine tool, without damaging the sorting apparatus.

It is also possible for the support elements to be detachably attached to the sorting apparatus, in particular to a frame thereof. This makes it possible to easily replace damaged support elements, and thereby economically repair the sorting apparatus.

It is also advantageous if at least two of the support elements form an inclined support surface. Inclined refers to a horizontal plane—for example, the floor level or the collection region or the remaining support elements. To provide the inclination, at least one of the support elements can be higher than other support elements. The height is measured in the falling direction or vertically to the horizontal plane. In particular, a height adjustability of the at least one support element can be provided in order to place the support element higher than each of the other support elements so that one support element does not have to be higher than the other support elements from the outset. This allows the workpiece sheet to be inclined in the support region, which can make it easier to sort the workpieces from the workpiece sheet.

Furthermore, it is advantageous if the sorting apparatus has at least one fixing device for fixing the workpiece sheet on the support region. The fixing device can, just as an example, be a clamping device, e.g., in the form of a clamping claw or a gripper, which can clamp the workpiece sheet on one of its sides.

The combination of two support elements of different heights and the use of at least one fixing device is advantageous. The workpiece sheet can float freely resting on two support elements of different heights. At least one fixing device prevents the workpiece sheet from slipping. The combination of inclination and in particular one-sided fixation, especially on the higher support element, leads to a significant increase in the removal speed when detaching the workpieces from the workpiece sheet, in particular by the action of a vibrating hammer. The reason for this is the natural vibration of the workpiece sheet, which is enhanced by its inclined position and in particular one-sided clamping. This allows a quick detachment of the workpieces from the workpiece sheet and, accordingly, faster sorting.

It is also preferred if the sorting apparatus has a fill-level monitoring device for determining the fill levels of the collection compartments. The fill-level monitoring device can, for example, be at least one scale, at least one camera, at least one sensor, and/or at least one light grid, which can each be assigned to a collection compartment or to all collection compartments together, in order to determine their fill levels. The fill-level monitoring device can also be designed to provide feedback on the fill levels of the collection compartments to the workers who operate the sorting apparatus. This feedback can, for example, be visual, such as by a screen on the sorting apparatus which continuously displays the fill levels, and/or acoustic—for example, by a loudspeaker on the sorting apparatus. This further improves the speed of sorting, because workers do not have to constantly inspect the fill level with their own eyes. It can also ensure that the collection compartments do not become too heavy, which makes the work easier. Finally, it prevents a collection compartment from overflowing and the workpieces from ending up in the wrong collection compartment.

It is also advantageous if the sorting apparatus has a camera device for monitoring the sorting operation. Such a camera device can be arranged above the support region. It can be set up to detect which workpieces become free and fall down to the collection compartments. The camera device can in turn be coupled to a display unit, in particular to the sorting apparatus, such as a screen on which a worker is shown which workpieces have fallen. In addition, the camera data recorded in this way can be used to provide feedback for another production order subsequent to sorting.

It is also advantageous if the sorting apparatus has a tool, which can be moved automatically in the support region, to break the predetermined breaking points between the workpieces and the workpiece sheet. The tool can be arranged on a support system above the support region. In particular, it can be moved in all spatial directions by means of an appropriate drive such as an electric drive. This enables automatic detachment of the workpieces from the workpiece sheets.

It can be advantageous if the sorting apparatus comprises a tool station with the tool, in particular in the form of a vibrating hammer, as well as with a robot arm or a C-shaped frame with three axes of movement, wherein the tool is arranged on the robot arm or the C-shaped frame. In addition, the tool station can include a camera system. In other words, the tool station can separate the workpieces from the workpiece sheet or finally separate them. The advantage of such a tool station over or above the support region is an ergonomic improvement when manually operating the corresponding tool of the tool station, in particular a vibrating hammer, e.g., designed as a pneumatic hammer, or a partial or full automation of the breaking operation. The C-shaped frame or the robot acts in this case as a support system above the support region, so that a worker no longer has to hold and operate the heavy tool. The camera system enables the detection of the predetermined breaking points, the position of the workpieces, the identification of broken and still unbroken predetermined breaking points, etc., so that the robot arm or the axes of movement can use the vibrating hammer precisely where workpieces have not yet been separated. The robot arm or the axes of movement can be controlled via a numerical control of the tool station. The C-shaped frame can rise above the support region from one or more arbitrary regions or a base frame of the sorting apparatus, wherein the vibrating hammer can be moved along all three spatial axes of the space by means of the movement axes in order to be able to detect every position of the support region with the tool, and accordingly be able to separate the workpiece parts.

For an alternative, more cost-effective option, the tool can be operated manually by a worker, but held by a support system. It would also be desirable to facilitate the use of the tool. It has been found to be advantageous if the sorting apparatus has a tool station with a tool for breaking open the predetermined breaking points between the workpieces and the workpiece sheet, wherein the tool station comprises a toggle press with the tool arranged thereon. The tool station can comprise automatically or manually movable axes of movement for the toggle press and/or the tool arranged thereon. Manually detaching the workpieces from the workpiece sheet is accordingly much more ergonomic and easier than a worker holding and operating a vibrating hammer in his hand.

Furthermore, it is advantageous if the collection region has a pallet region for or with a pallet for storing the at least two collection compartments thereon. Storage on a pallet enables machine-assisted removal of collection compartments—for example, using a pallet truck. This is advantageous because the collection compartments can become very heavy, and manual removal of collection compartments by a worker is then no longer to be recommended. Furthermore, removal is otherwise unergonomic due to the arrangement of the collection region at the bottom on the sorting apparatus. The pallet region is an additional region provided in the sorting apparatus, which corresponds at least to the height of the pallet and otherwise to the other dimensions of the pallet, in particular a Euro pallet. The Euro pallet has dimensions of 800 mm×1,200 mm×144 mm, so the pallet region can have at least these dimensions. The sorting apparatus is preferably laterally open on at least one side to ensure accessibility by the pallet truck.

It is also advantageous if a predefined minimum distance is provided between the at least one guide element and the at least two collection compartments, which corresponds to a lifting height for lifting the pallet in the sorting apparatus, wherein the minimum distance is in particular at least 30 mm, or at least 40 mm, and further preferably at least 50 mm. This can enable easy removal of the pallet with the collection compartments thereon using a pallet truck. The minimum distance can be achieved in particular by a correspondingly short design of the at least one guide element.

The object mentioned at the outset is also achieved by a separation system having a machine tool, in particular a flatbed machine tool, for cutting, in particular laser cutting, or punching the workpieces from the workpiece sheet, and a sorting apparatus according to embodiments of the invention.

In this regard, features that are described herein with respect to the sorting apparatus also apply with respect to the separating system, and vice versa.

As previously described, the flatbed machine tool can in particular be a laser cutting and/or punching flatbed machine tool, wherein further production steps can also be taken on by the flatbed machine tool. The separating system can further have at least one tool for breaking open the predetermined breaking points between the workpieces and the workpiece sheet.

The object mentioned at the outset is also achieved by a removal system designed for removing and sorting workpieces of a workpiece sheet, wherein the removal system has a conveyor belt device and a sorting apparatus, arranged or arrangeable thereon, according to any of the preceding claims.

The removal system according to embodiments of the invention makes it possible for the cut workpiece sheets previously manually placed on the sorting apparatus to now be easily, in particular automatically, placed on the sorting apparatus, thereby simplifying and accelerating removal and sorting. It can be provided that the sorting apparatus be able to be mechanically coupled to the conveyor belt. The conveyor belt can be equipped with an automatic drive. The removal system can also have a vibrating station that acts across all or part of the width of the conveyor belt device to vibrate workpieces out of the workpiece sheet. Furthermore, the sorting apparatus and the conveyor belt device can be height-adjustable in sync with each other.

In this case, features that are described herein with respect to the removal system also apply with respect to the separating system and the sorting apparatus, and vice versa.

According to some embodiments, an assembly comprises the separating system according to embodiments of the invention and the removal system according to embodiments of the invention. The assembly therefore comprises the sorting apparatus, the conveyor belt device, and the machine tool to enable partial or fully automated separation, removal, and sorting of the workpieces.

In this case, features that are described herein with respect to the assembly also apply to the separating system, the removal system, and the sorting apparatus, and vice versa.

The object mentioned at the outset is also achieved by a method for sorting workpieces of a workpiece sheet in which the workpieces are connected to the workpiece sheet by a predetermined breaking point, using the sorting apparatus according to embodiments of the invention, wherein the method has the following steps:

- placing the workpiece sheet on the support region of the sorting apparatus,
- adjusting the adjustment device to select one of the collection compartments of the sorting apparatus into which the workpieces of the workpiece sheet are to be guided, and
- detaching the workpieces from the workpiece sheet using a tool so that the workpieces pass via the guide region into the collection compartment, selected by means of the adjustment, in the collection region of the sorting apparatus.

In this case, features that are described herein with respect to the sorting apparatus, the separating system, the removal system, and the assembly also apply with respect to the method, and vice versa.

The object mentioned at the outset is furthermore achieved by a method for separating workpieces of a workpiece sheet, wherein the method has the step of cutting or punching the workpieces from the workpiece sheet by means of a machine tool, in particular a flatbed machine tool, and the method according to embodiments of the invention for sorting the workpieces on the workpiece sheet.

In this case, features that are described herein with respect to the sorting apparatus, the separating system, the removal system, the assembly, and the sorting operation also apply with respect to the separating method, and vice versa.

In the following description and in the figures, identical reference signs are in each case used for identical or corresponding features.

FIG. 1 shows a sorting apparatus 10 for assisting a sorting operation. The sorting apparatus 10 comprises a frame 11 and is open on the shown side so that a view into the interior of the sorting apparatus 10 is possible. This primarily enables easy access to collection compartments 31 in a collection region 30 of the sorting apparatus 10.

Alternatively, a covering can be provided which, however, can be at least partially transparent and/or removable. For example, a covering can consist of doors or a wire mesh.

Figure 2:
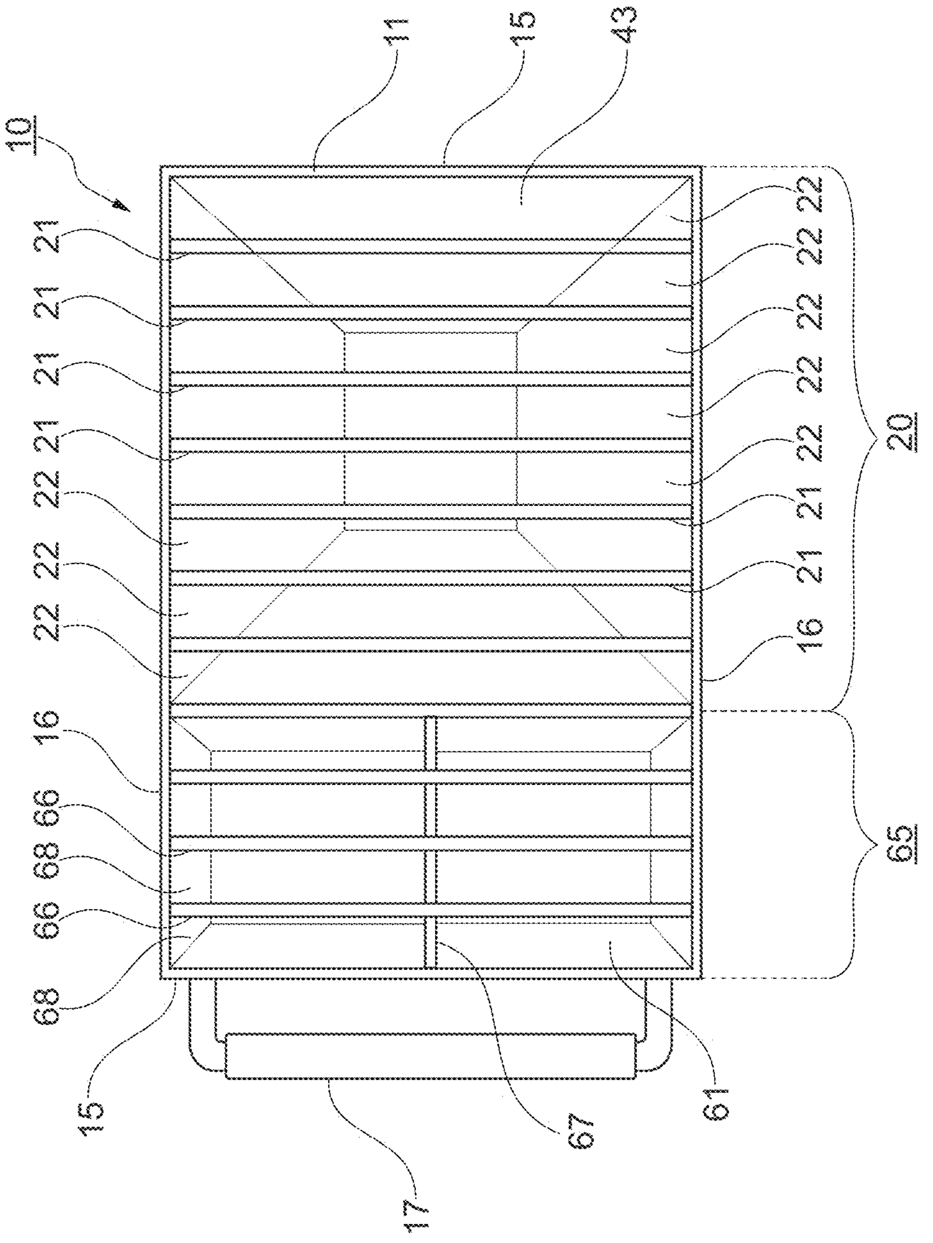
FIG. 2 is a plan view of the sorting apparatus from FIG. 1 according to some embodiments.

The sorting apparatus 10 is equipped with rollers 13 by means of corresponding connecting elements 12, wherein at least one of the rollers 13 is also equipped with a brake 14. The sorting apparatus 10 is therefore designed as a sorting cart that can be easily moved in a production hall. As FIG. 2 shows in the top view of the sorting apparatus 10 from FIG. 1, a handle 17, in particular a bow-shaped handle 17, can also be provided on the frame 11 in order to be able to comfortably push the sorting apparatus 10.

In FIG. 1, a support region 20 is located at the top of the sorting apparatus 10. This support region 20 serves to support a workpiece sheet 1 (see FIGS. 11 to 14). Workpieces 2 have been machined into the workpiece sheet 1 by means of a flatbed machine tool (see FIG. 13, 14), which are only connected to the rest of the workpiece sheet 1 via a predetermined breaking point, in particular in the form of a micro-bridge.

Inside the sorting apparatus 10, the workpieces 2 can be sorted into suitable collection compartments 31 according to their geometry. For this purpose, the workpieces 2 in the support region 20 are detached from the workpiece sheet 1 by a tool 81 (see FIG. 16), such as a vibrating hammer, by breaking open the predetermined breaking point. The workpieces 2 thereby fall through corresponding sorting openings 22 between support elements 21 (see FIG. 2) which form the support surface of the workpiece panel 1 on the receiving region 20.

Within the sorting apparatus 10, below the support region 20, i.e., in the falling direction of the workpieces 2 or the direction of gravity, a guide region 40 and, below that, the collection region 30 are arranged on a corresponding floor of the sorting apparatus 10, wherein the collection region 30 has the collection compartments 31. The collection compartments 31 in the present case are designed as collection boxes, and a total of four collection boxes are provided as an example, as can be seen in FIG. 3.

Figure 3:
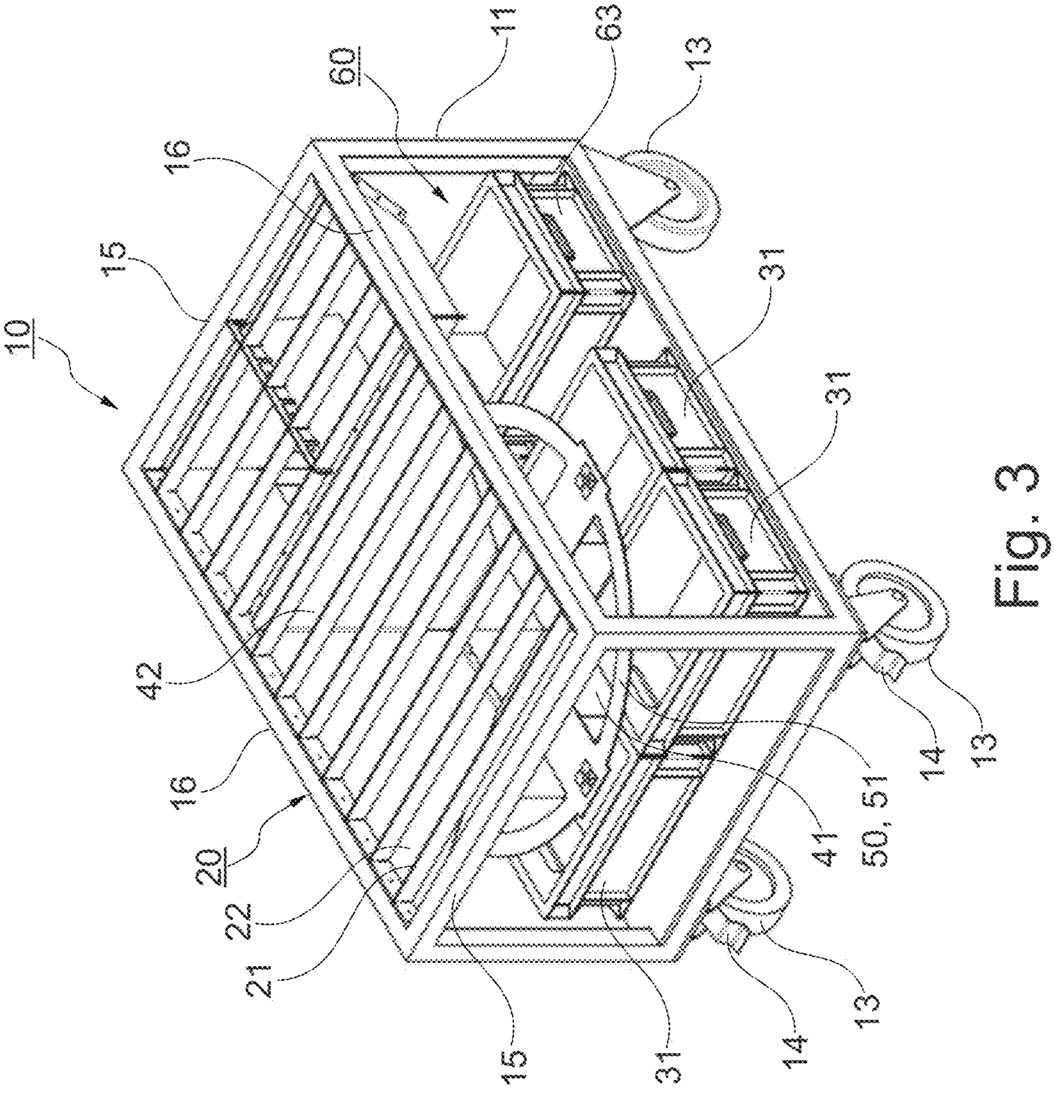
FIG. 3 is a perspectival view of the sorting apparatus from FIG. 1 according to some embodiments.

From FIG. 3, it can be seen that the sorting apparatus 10 is open in this case on all its sides 15, 16, wherein, as previously explained, coverings can also be provided on one, several, or all sides 15, 16.

Between the collection region 30 and the support region 20, there is a guide region 40, which in FIGS. 1 and 2 comprises a funnel element 42 and a guide element 41. The funnel element 42 in this case has, for example, a rectangular cross-section, and the guide element 41 can for example also be designed as a funnel or, alternatively, as a tube or chute. After being detached from the workpiece panel 1, the workpieces 2 fall through the funnel element 42, which guides them further to the guide element 41, and the guide element 41 guides the workpieces 2 to one of the collection compartments 31. As shown, one or more sound absorption elements 43 can be arranged on the funnel element 42 in order to minimize noise when guiding the workpieces 2.

For the selection of a collection compartment 31 to which the workpieces 2 are to be guided by means of the guide element 31, an adjustment device 50 is provided between the funnel element 42 and the guide element 41. The adjustment device 50 allows an adjustment of the guide element 41, which is attached to the funnel element 42, relative to the collection compartments 31 in the shown adjustment direction 3. The adjustment direction 3 is a direction of rotation, because the adjustment is carried out by a rotation in which the guide element 41 is aligned with its end or its opening to one of the four collection compartments 31. For this purpose, the adjustment device 50 comprises a rotary wheel 51 which allows the guide element 41 to be rotated relative to the funnel element 42 and in alignment with one of the four collection compartments 31. Accordingly, based upon the respective geometry of the workpieces 2 of the workpiece panel 1, it is possible to select, by adjusting the guide element 41, into which of the four collection compartments 31 the workpieces 2 are to be sorted.

In addition to the support region 20 which is formed by the support elements 21 which in this case run, for example, between long sides 16 of the sorting apparatus 10, an optional additional support region 65 is provided, which in turn is provided with additional support elements 66, 67, between which additional sorting openings 68 are formed. The additional support region 65 is part of an optional additional region 60 in addition to the previously explained regions comprising the support region 20, the collection region 30, and the guide region 40. The additional region 60 in turn comprises a further funnel element 61 with an optional further pipe element 62 for guiding workpieces through the additional sorting openings 68 to two additional collection compartments 63. The optional additional region 60 can also be used for sorting, wherein, for example, workpieces 2 can be sorted in this case by drilling out microjoints in a workpiece panel 1 using a drilling tool, while the workpieces 2 in the support region 20 can be sorted using a vibrating hammer. The detachment of workpieces 2 by drilling or a vibrating hammer can be carried out in parallel or one after the other, depending upon which workpiece sheets 1 are present. The optional additional region 60 accordingly extends the functionality of the sorting apparatus 10. Nevertheless, it can be provided that the optional additional region 60 in the sorting apparatus 10 be omitted, so that only the left part of the sorting apparatus 10 shown in FIG. 1 with the support region 20, the collection region 30, and the guide region 40 is provided in the sorting apparatus 10.

Figure 4:
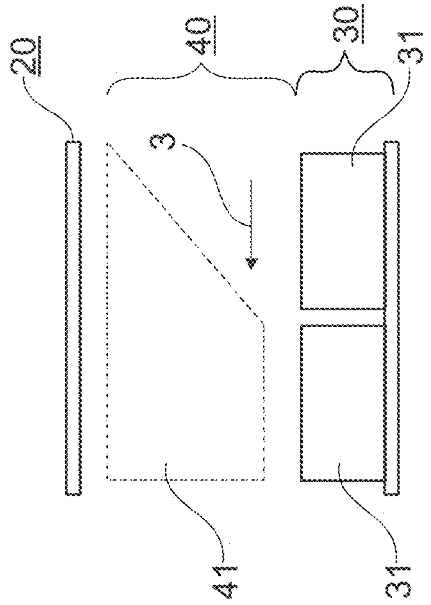
FIG. 4 is a schematic representation of a part of an alternative sorting apparatus according to some embodiments.

FIG. 4 shows an alternative guide region 40 which has a flexible guide element 41—for example, a hose. The flexible guide element 41 has been adjusted in FIG. 4 in the shown adjustment direction 3 by means of an adjustment device 50 (not shown), e.g., a fixing device, such as a movable ring, for fixing the flexible guide element 41 in the position shown in FIG. 4. As a result, the flexible guide element 41 is assigned to the left of the two collection compartments 31 visible in FIG. 4 and enables workpieces 2 to be guided from the support region 20 to the left collection compartment 31 of FIG. 4.

Figure 5:
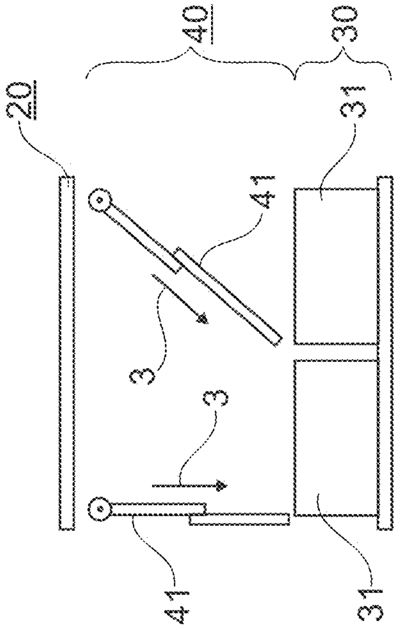
FIG. 5 is a schematic representation of part of another alternative sorting apparatus according to some embodiments.

FIG. 5 also shows an alternative guide region 40 which has two dividing flaps as guide elements 41, which are also displaceable in their length. The dividing flaps can be rotated via corresponding swivel joints to open or close regions lying underneath. In addition, the dividing flaps can be extended to enable optimal feeding of the workpieces 2 up to just before the collection compartments 31. The adjustment device 50, not designated here, can in this respect comprise the swivel joints and the mechanism for extending the part flaps. Here too, the workpieces 2 are guided into the left collection compartment 31 by way of example.

Figure 6:
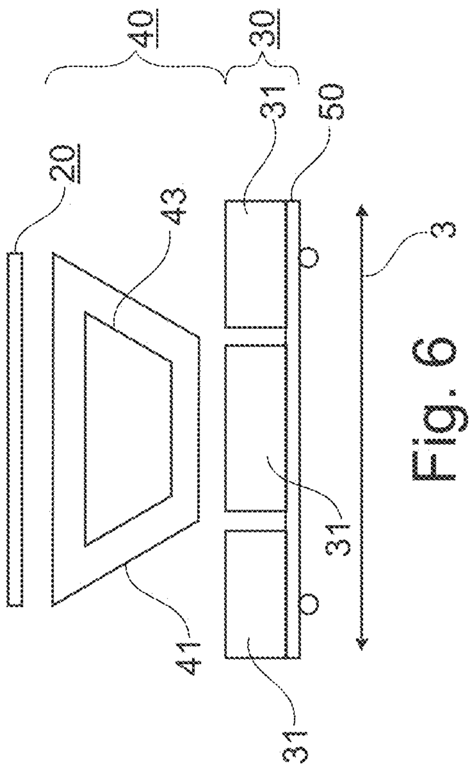
FIG. 6 is a schematic representation of part of yet another alternative sorting apparatus according to some embodiments.
Figure 12:
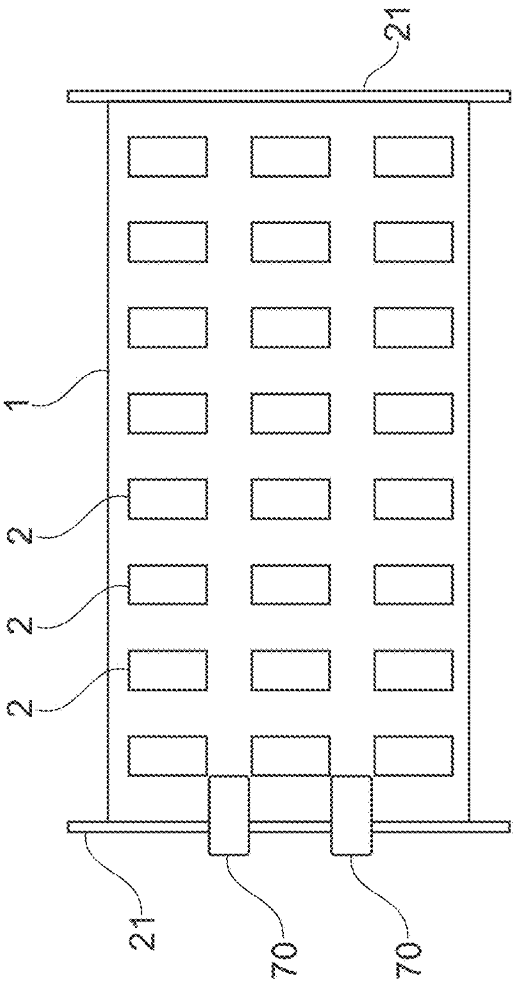
FIG. 12 is a plan view of the support region from FIG. 11 according to some embodiments.

FIG. 6 shows another alternative adjustment device 50, this time not in the guide region 40, but, rather, in the collection region 30. The guide region 40 with its guide element 41 and, if applicable, its funnel element 42 is stationary. The adjustment device 50 is designed as a cart on rollers—alternatively also possible on rails, for example—on which the collection compartments 31 are positioned and which is movable in one of the linear adjustment directions 3. The guide region 40 is designed here, for example, with a guide element 41 in the form of a funnel. At least one sound absorption element 43 in the form of a sound absorption mat is arranged thereon. By moving the collection compartments 31 by means of the adjustment device 50 below the opening of the guide element 41, the collection compartments 31 to which the workpieces 2 are guided can be selected.

Figure 7:
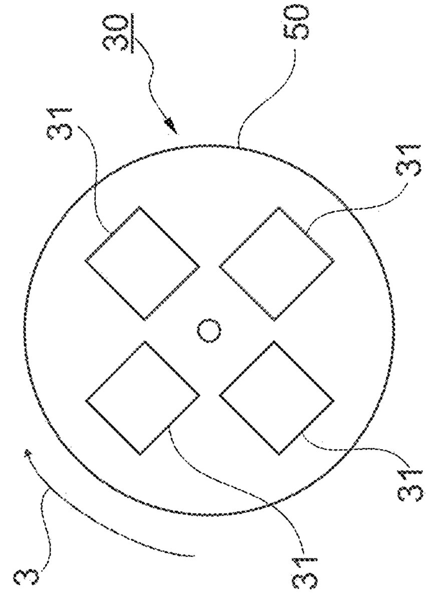
FIG. 7 is a schematic representation of part of a further additional alternative sorting apparatus according to some embodiments.

FIG. 7 shows yet another alternative adjustment device 50 which is again arranged on the collection region 30 and is designed as a cart. In contrast to FIG. 6, however, the cart can be rotated in the shown adjustment direction 3 with the collection compartments 31 located thereon, and cannot be moved linearly. Accordingly, the guide element 41 can be aligned with one of the collection compartments 31 by rotating the adjustment device 50.

Figure 10:
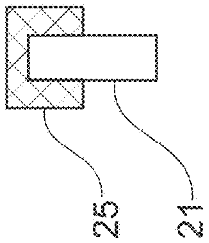
FIG. 10 is a cross-sectional view through yet another possible embodiment of a support element of the sorting apparatus from FIG. 1.
Figure 9:
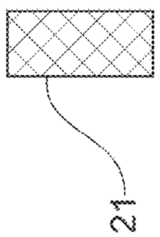
FIG. 9 is a cross-sectional view through another possible embodiment of a support element of the sorting apparatus from FIG. 1.
Figure 8:
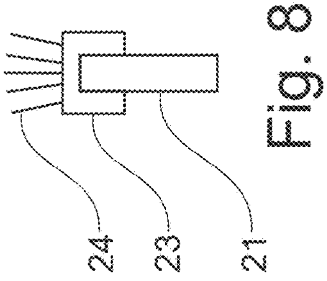
FIG. 8 is a cross-sectional view through a possible embodiment of a support element of the sorting apparatus from FIG. 1.

FIGS. 8 to 10 show different possible embodiments of the support elements 21 for avoiding damage to the workpieces 2 when the workpiece panel 1 is placed thereon. In FIG. 8, an attachment element 23 in the form of a coating, e.g., made of a plastic or rubber, with bristles 24 thereon is provided on which the workpiece panel 1 can be placed. This prevents scratching, reduces the noise level, and allows better handling of the workpiece sheet 1. In FIG. 9, the entire support element 21 is made of an elastic plastic. In FIG. 10, only one elastic attachment element 25, e.g., made of elastic plastic or rubber, is arranged on the support element 21. The support elements 23, 25 can be detachably attached, in order to replace them if necessary, to the support elements 21.

Figure 11:
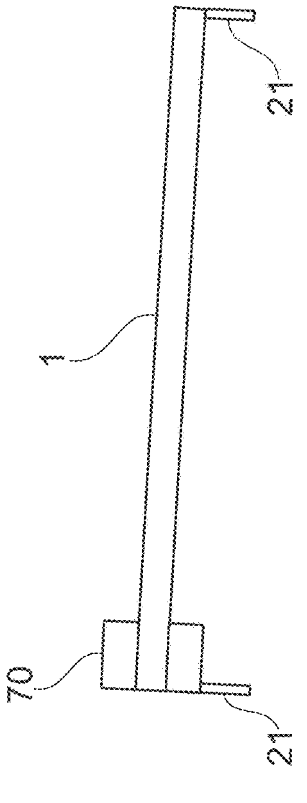
FIG. 11 is a side view of a possible embodiment of the support region of the sorting apparatus from FIG. 1.

FIG. 11 shows two support elements 21 of different heights, wherein one or both of these support elements 21 can be height-adjustable. In addition, as FIG. 12 further shows, a workpiece panel 1 with workpieces 2 therein is clamped to one of the two support elements 21 by means of a fixing device 70. This allows the workpiece panel 1 to swing freely when the workpieces 2 are detached from the workpiece panel 1 and thereby allows the workpieces 2 to be detached quickly from the workpiece panel 1 when using an appropriate vibrating hammer.

Figure 13:
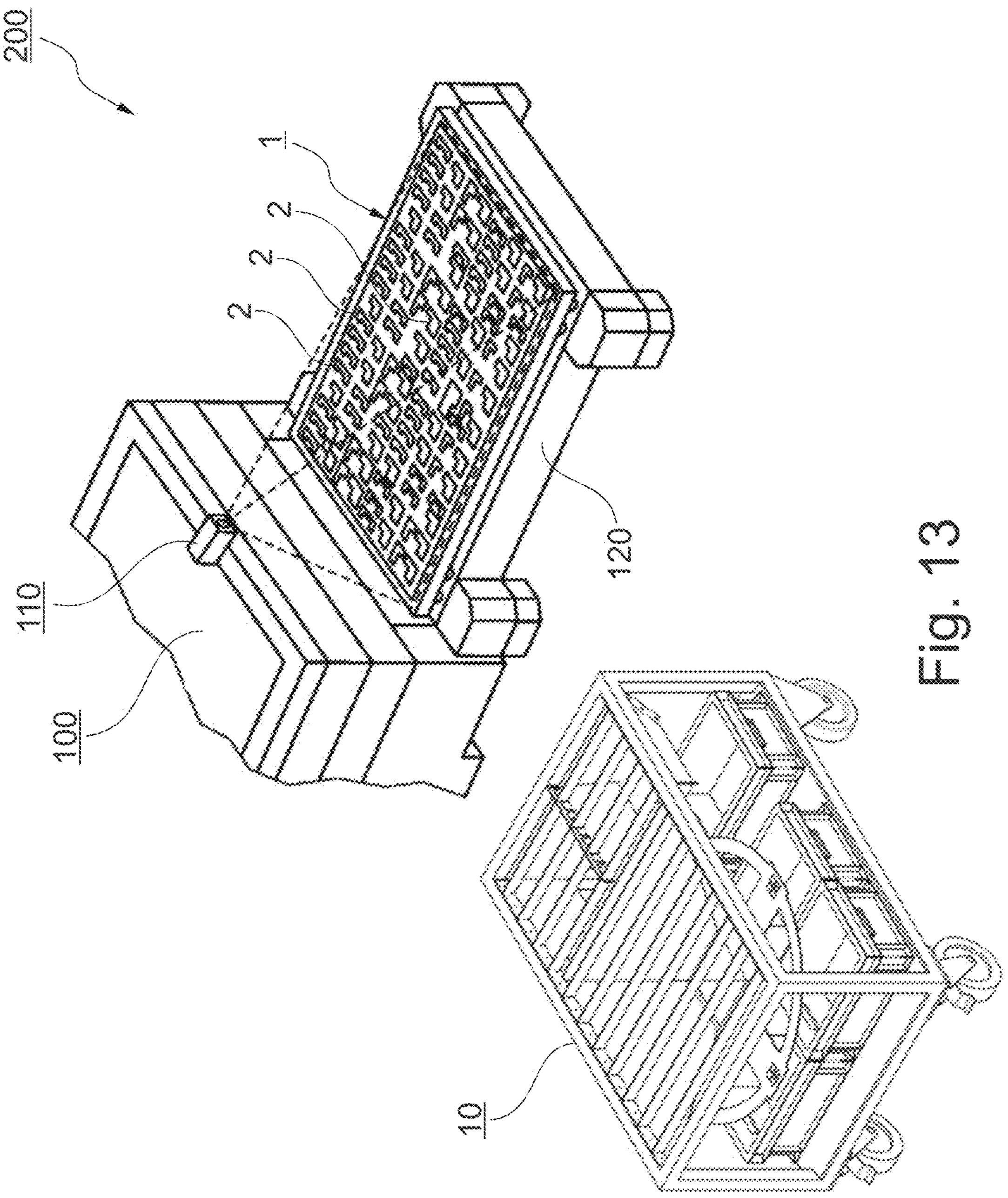
FIG. 13 is a perspectival view of a separating system according to an exemplary embodiment of the invention.

FIG. 13 shows a separating system 200 comprising a flatbed machine tool 100 and the sorting apparatus 10 from FIG. 3. The flatbed machine tool 100 in this case comprises, for example, a camera unit 110 and a table or a pallet 120 onto which the workpiece panel 1 coming from the flatbed machine tool 100 is placed. A worker can now simply lift the workpiece panel 1 from the table or pallet 120 onto the sorting apparatus 10, which he can roll up to the front of the table 120. A lifting device can be provided if required.

Figure 14:
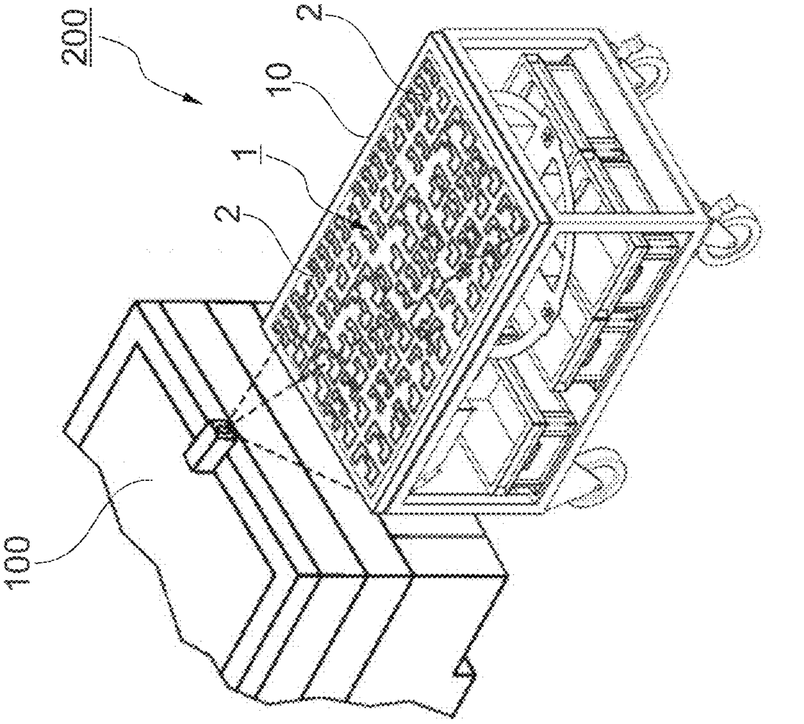
FIG. 14 is a perspectival view of a separating device according to another exemplary embodiment of the invention.

FIG. 14 shows an alternative separating system 200, compared to FIG. 13. In this separating system 200, the table or the pallet 120 is omitted, and, instead, the workpiece panel 1 coming from the flatbed machine tool 100 is placed directly on the sorting apparatus 10.

If the sorting with the sorting apparatus 10 takes longer than the processing of another workpiece panel 1 in the flatbed machine tool 100, another sorting apparatus 10 can be provided. Instead of the sorting apparatus 10 on which a workpiece panel 1 has already been placed, this can be moved in front of the flatbed machine tool 100 in order to pick up the next workpiece panel 1. As a result, the otherwise necessary lifting of the workpiece panel 1 is advantageously eliminated.

Figure 15:
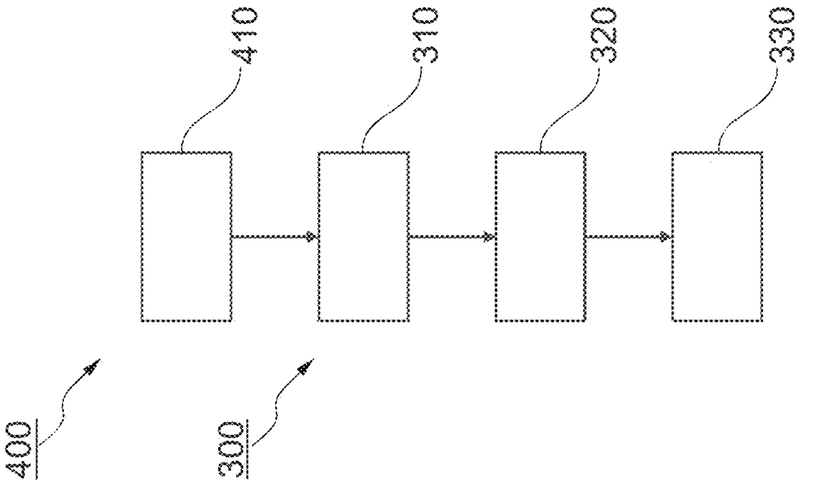
FIG. 15 is a schematic representation of the separation and sorting method according to embodiments of the invention.

FIG. 15 schematically shows a separation method 400 for separating workpieces 2 from a workpiece panel 1, comprising a sorting method 300. The separation method 400 can be carried out with the separating system 200 of FIGS. 13 and 14. The sorting method 300 can be carried out with the sorting apparatus 10.

In a first step 410 of the separation method 400, the workpieces 2 are cut out of the workpiece panel 1 in the flatbed machine tool 100—for example, by laser cutting or punching.

In a second step 310 of the separation method 400, which is also a first step of the sorting method 300, the processed workpiece sheet 1 with the cut-out workpieces 2 held together by the predetermined breaking point with the workpiece sheet 1 is placed on the support region 20 of the sorting apparatus 10.

In a third step 320 of the separating method 400, which is also a second step of the sorting method 300, the adjustment device 50 is adjusted to select one of the collection compartments 31 of the sorting apparatus 10. This selects the collection compartments 31 to which the workpieces 2 are to be guided by the subsequent detachment in the fourth step 330 of the separating method 400, which is also a third step of the sorting method 300. However, the third step 320 does not necessarily have to take place after the second step 310 or the first step 410, but can also take place beforehand if it is known which collection compartment 31 is to be used for sorting the workpieces 2 of the workpiece panel 1.

In the fourth step 330 of the separation method 400, the workpieces 2 are finally detached from the workpiece sheet 1, for which purpose a tool 81 (see FIG. 16) is used. This can, for example, be a vibrating hammer. The detached workpieces 2 are guided via the guide region 40 to the previously selected collection compartment 31 in the collection region 30 of the sorting apparatus 10.

Figure 16:
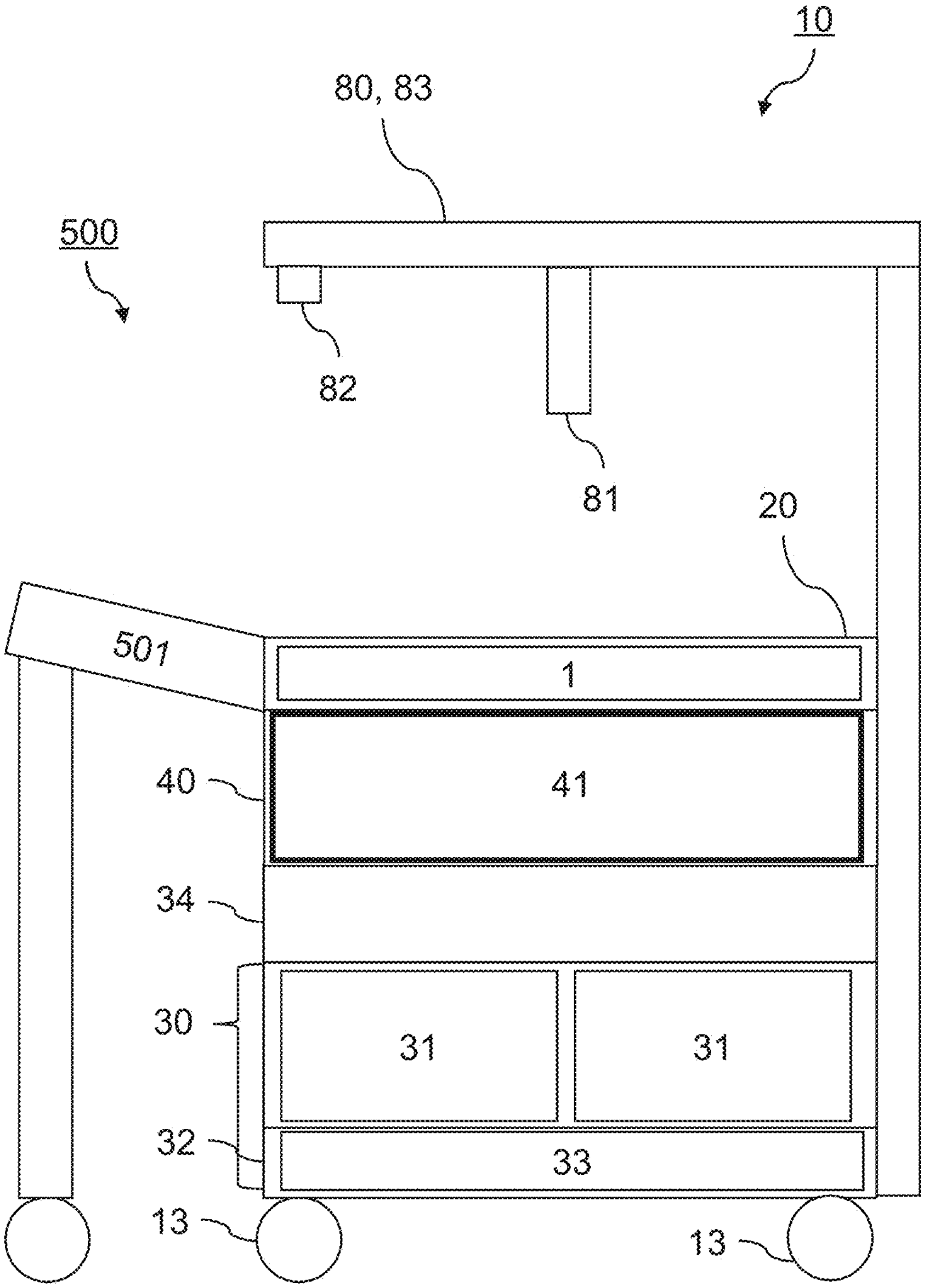
FIG. 16 is a further exemplary embodiment of a sorting apparatus according to embodiments of the invention in a schematic representation.

FIG. 16 shows a further, merely schematically represented, embodiment of a sorting apparatus 10. In this sorting apparatus 10, in addition to the other embodiments, in the collection region 30, a pallet region 32 is provided, in which a pallet 33 is located. The collection compartments 31 in this case are arranged on the pallet 33. Since a minimum distance 34 corresponding to a lifting height of a pallet truck (not shown) is also provided between the collection compartments 31 and the guide element 41, the pallet 33 can be lifted unhindered by means of the pallet truck within the sorting apparatus 10, and removed laterally from an open side of the sorting apparatus 10.

FIG. 16 also shows a tool station 80 as part of the sorting apparatus 10 above the support region 20, in which the workpiece sheet 1 is located. By way of example, a C-shaped frame 83 is shown here which holds a tool 81, in particular a vibrating hammer, for breaking open the predetermined breaking points in the workpiece sheet 1. In the C-shaped frame 83, movement axes (not shown) are provided for moving the tool 81 over the workpiece sheet 1. Alternatively, it is also possible to use a robot arm instead of the C-shaped frame 83. The tool station 80 also comprises a camera system 82, by means of which the workpiece sheet 1 with its predetermined breaking points can be detected, in order to control the tool 81, according to the current progress of the breaking operation, so that the remaining predetermined breaking points are broken open.

As an alternative to this automated variant, it is also possible to provide a C-shaped frame 83 with movement axes with, for example, a toggle press for operating the tool 81, so that the tool 81 is held by the tool station 80, but is to be operated manually.

FIG. 16 further shows a removal system 500 comprising the sorting apparatus 10 as well as a conveyor belt apparatus 501, which is coupled here to the sorting apparatus 10. The cut workpiece sheet 1 can be easily transported from the machine tool 100 (see FIG. 13) to the sorting apparatus 10 via the conveyor belt apparatus 501. In this respect, the conveyor belt apparatus 501, the sorting apparatus 10, and the machine tool 100 can also form an assembly (not shown separately).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A sorting apparatus for assisting a sorting operation of workpieces of a workpiece sheet, wherein the workpieces are connected to the workpiece sheet by predetermined breaking points, the sorting apparatus comprising:

a support region with support elements for placing the workpiece sheet thereon, the support elements being configured as support bars spaced apart from one another and arranged parallel to one another between two sides of the sorting apparatus, wherein a plurality of sorting openings for the workpieces to fall through are formed between adjacent support elements such that the support region is configured as a support grid, an additional support region with additional support elements for placing the workpiece sheet thereon, the additional support elements being configured as support bars spaced apart from one another so as to form a plurality of additional sorting openings between adjacent additional support elements for the workpieces to fall through, the additional sorting openings being smaller than the sorting openings of the support region, a collection region arranged below the support region and additional support region and having at least two collection compartments for collecting the workpieces falling through the plurality of sorting openings and additional sorting openings, a guide region arranged between the support region and the collection region and between the additional support region and the collection region and having at least one guide element for guiding the workpieces falling through the plurality of sorting openings to the collection compartments, and an adjustment device for adjusting the collection compartments relative to the at least one guide element and/or for adjusting the at least one guide element relative to the collection compartments such that, via the at least one guide element, workpieces are selectively fed to a respective collection compartment selected from the at least two collection compartments by the adjusting, wherein the support elements comprise brushes on a support side for placing the workpiece sheet, and wherein at least two of the support elements form an inclined support surface.

2. The sorting apparatus according to claim 1, wherein the at least one guide element is configured as a funnel, a tube, a chute, or a flap.

3. The sorting apparatus according to claim 1, wherein the guide region further has a funnel element arranged above the at least one guide element.

4. The sorting apparatus according to claim 1, wherein the adjustment device comprises a rotary mechanism and/or a linear mechanism for rotating and/or linearly displacing the at least one guide element or the collection compartments relative to one another.

5. The sorting apparatus according to claim 4, wherein the adjustment device comprises a rotary mechanism for rotating the at least one guide element or the collection compartments relative to one another, and wherein the rotary mechanism comprises a rotating wheel connected to the at least one guide element, with at least one handle for rotating the at least one guide element relative to the collection compartments.

6. The sorting apparatus according to claim 1, wherein the guide region further has at least one sound absorption element.

7. The sorting apparatus according to claim 1, wherein the support elements are configured to be elastic.

8. The sorting apparatus according to claim 1, wherein the support elements are heat-resistant up to at least 80° C.

9. The sorting apparatus according to claim 1, further comprising at least one fixing device for fixing the workpiece sheet on the support region.

10. The sorting apparatus according to claim 1, further comprising a tool capable of being moved automatically in the support region, for breaking open the predetermined breaking points between the workpieces and the workpiece sheet.

11. The sorting apparatus according to claim 10, further comprising a tool station with the tool in a form of a vibrating hammer, wherein the tool station comprises a robot arm or a C-shaped frame with three axes of movement, and wherein the tool is arranged on the robot arm or the C-shaped frame.

12. The sorting apparatus according to claim 1, further comprising a tool station with a tool for breaking open the predetermined breaking points between the workpieces and the workpiece sheet, wherein the tool station comprises a toggle press with the tool arranged thereon.

13. The sorting apparatus according to claim 1, wherein the collection region has a pallet region with a pallet for storing the at least two collection compartments thereon.

14. The sorting apparatus according to claim 13, wherein a predefined minimum distance is provided between the at least one guide element and the at least two collection compartments, wherein the predefined minimum distance corresponds to a lifting height for lifting the pallet in the sorting apparatus, and wherein the predefined minimum distance is at least 30 mm.

15. A separating system for separating workpieces of a workpiece sheet, the separating system comprising a machine tool for cutting or punching the workpieces from the workpiece sheet and a sorting device according to claim 1.

16. An assembly with a separating system according to claim 15.

17. A removal system for removing and sorting workpieces of a workpiece sheet, the removal system comprising a conveyor belt device and a sorting apparatus arranged thereon, according to claim 1.

18. A method for sorting workpieces of a workpiece sheet using a sorting apparatus according to claim 1, wherein the workpieces are connected to the workpiece sheet by predetermined breaking points, the method comprising:

placing the workpiece sheet on the support region of the sorting apparatus, adjusting the adjustment device to select a respective collection compartment of the at least two collection compartments of the sorting apparatus, to which the workpieces of the workpiece sheet are to be guided, and detaching the workpieces from the workpiece sheet using a tool so that the workpieces pass via the guide region into the respective collection compartment, selected by the adjustment device.

19. A method for separating workpieces of a workpiece sheet, the method comprising cutting or punching the workpieces from the workpiece sheet by a machine tool, and sorting the workpieces according to the method of claim 18.

20. The sorting apparatus according to claim 1, wherein the inclined support surface is formed by a first of the at least two support elements being arranged higher relative to a floor level than a second of the at least two support elements.

* * * * *